United States Patent [19]
Ebenstein

[11] Patent Number: 5,836,209
[45] Date of Patent: Nov. 17, 1998

[54] SHIFTER WITH PIVOT PIN HAVING RETENTION TAB

[75] Inventor: Scott M. Ebenstein, Rockford, Mich.

[73] Assignee: Grand Haven Stamped Products Division of JSJ Corporation, Grand Haven, Mich.

[21] Appl. No.: 777,527

[22] Filed: Dec. 30, 1996

[51] Int. Cl.$^6$ ............................................. F16H 59/04
[52] U.S. Cl. ........................... 74/473.21; 74/473.25; 74/548; 403/14; 403/71
[58] Field of Search ...................... 74/548, 475, 473.21, 74/473.24, 473.25; 403/13, 14, 70, 71

[56] References Cited

U.S. PATENT DOCUMENTS

| | | | |
|---|---|---|---|
| 2,062,108 | 11/1936 | Rickerson | 74/475 |
| 3,250,148 | 5/1966 | Soles | 74/475 |
| 3,386,306 | 6/1968 | Kenyon | 74/475 |
| 5,277,078 | 1/1994 | Osborn et al. | 74/475 |
| 5,309,783 | 5/1994 | Doolittle et al. | 74/473 |
| 5,442,975 | 8/1995 | Osborn | 74/473 R |
| 5,445,046 | 8/1995 | Kataumi et al. | 74/527 |
| 5,497,673 | 3/1996 | Kataumi et al. | 74/473 R |
| 5,598,740 | 2/1997 | Itoh | 74/475 |
| 5,651,293 | 7/1997 | Ebenstein | 74/475 |

Primary Examiner—Rodney H. Bonck
Assistant Examiner—David M. Fenstermacher
Attorney, Agent, or Firm—Price, Heneveld, Cooper, Dewitt & Litton

[57] ABSTRACT

A shifter having a base and a shift lever assembly pivotally mounted on the base by a separate pivot member. The pivot member includes a device for keying it to the shift lever assembly and the base includes an opening device configured for receiving the pivot member which includes a radially extending tab at its extreme end. After being inserted in the opening device of the base, the tab prohibits the pivot member from being withdrawn from the base.

14 Claims, 12 Drawing Sheets

SHIFTER WITH PIVOT PIN HAVING RETENTION TAB

This invention relates to a shifter for shifting vehicle transmissions, and more particularly, concerns a shifter having a unique pivot construction with a minimum of parts and constructed to facilitate easy assembly.

BACKGROUND OF THE INVENTION

The industry for supplying shifters for vehicles is highly competitive. Therefore, efforts are consistently made to design shifters with a minimum of parts and which can easily be assembled so as to minimize the cost of such shifters. Further, modern vehicle manufacturers are emphasizing just-in-time delivery so that inventories are kept as low as possible thus reducing the cost of manufacturing.

Frequently, shifter components are manufactured in a central first location and subassembled in a plurality of second locations near where the various vehicle assembly plants are located. Also, in order to reduce cost it has become desirable to use as unskilled labor as possible and a minimum of assembly equipment at the assembly locations. Further, it has been the aim to minimize the chances of misassembly. Also, it is desirable to provide a serviceable shifter that can be readily disassembled and repaired if necessary.

Many present day shifters include a base to be attached to the frame of the vehicle and a shift lever pivoted on the base by one or more pivot pins. In these type of shifters the pivot pins are generally secured to the base by staking, peening, clips, nuts, or otherwise deforming an end of the pivot pins to secure the pivot pin in place on the base to prevent the pivot pin from sliding out of the opening formed in the base. Such methods require expensive power equipment to be operated by skilled laborers and sometimes close tolerances to assure that when the pin is staked, peened, or otherwise deformed the deformation is consistent and adequately secures the pivot pin in place particularly when the pin is to be pivoted with the shift lever. This requires the pivot pins be handled and manipulated such that the assembly process is more tedious and inefficient than desired. Also, missing parts are a potential problem. Accordingly, there has been a need for a shifter that can be efficiently constructed with a minimum of parts and that can be readily and easily assembled with a minimum of equipment and a minimum of errors in the assembly. In addition to such needs, the pivoting means for the shift lever to the base must be secure, reliable, and serviceable.

SUMMARY OF THE INVENTION

The present invention includes a shifter for a vehicle including a base for attachment to the vehicle, a shift lever assembly and a pivot member for pivotally mounting the shift lever assembly on the base. The base includes spaced aligned sockets between which a portion of a shift lever assembly is received. The sockets have aligned openings for pivotally receiving the pivot member. The unique feature of the present invention is the provision of providing a tab at one end of the pivot member extending radially from the pivot member and providing a flange located outwardly of one of the sockets. The flange has an outer surface and an inner surface, the inner surface being located laterally outwardly of the one socket. The flange has an opening configured to receive the end of the pivot member and the tab when the shift lever is in a predetermined assembly-permitting angular position. In other words, the opening in the flange has a configuration like that of a key hole for receiving the key of a lock. Thus, the pivot member and tab in an assembly-permitting angular position of the shift lever permits the entire end of the pivot member with the tab to be inserted through the opening in the flange. After such end is inserted through the opening in the flange, pivoting the shift lever assembly locates the tab inside the inner surface of the flange thus prohibiting the pivot member in any pivotal position of the shift lever assembly from being withdrawn except when the shift lever assembly is in the assembly-permitting angular position. A removable pawl is provided to be mounted on the shift lever assembly. This pawl is mounted to engage the various notches for the plurality of gear positions. When removed, it permits the shift lever to pivot to the assembly-permitting angular position. However, after the shift lever assembly is pivoted from the assembly-permitting angular position to one of the angular gear positions, the pawl is inserted to prevent the shift lever assembly from being pivoted to the assembly-permitting angular position which prevents the pivot member from being withdrawn from the sockets when said shift lever is in any one of the gear positions.

The present invention also involves the method of assembly as should be evident from the above description of its structure. The method includes providing the base with aligned and spaced sockets between which a shift lever can be located. The base is also provided with a flange located outwardly of one of the bearings to provide a space between the bearing and the flange. The flange is provided with an opening having a configuration for receiving one end of a pivot member which includes a radially extending tab. A shift lever assembly is provided having a first opening for receiving the pivot member whereby the shift lever assembly is pivotable with the pivot member in the bearing openings about an axis of rotation between an assembly-permitting angular position and a plurality of gear positions. The steps in assembling these members is by first inserting a portion of the shifting lever assembly between the sidewalls with the openings thereof axially aligned with the bearings and then pivoting the shift lever assembly to an assembly-permitting angular position. While the shift lever assembly is in this position, one end of the pivot member is inserted through the opening in the flange, through the one bearing opening and through the opening of the shift lever assembly and into the other bearing opening. The end of the pivot member which includes the radially extending tab is then inserted through the configurated opening of the flange after which the shift lever assembly is pivoted to at least one of the gear positions which causes the pivot member with its tab to pivot causing the tab to pivot into the space between the one bearing and the flange. In this position the pivot member is prevented from being axially removable during the pivoting of the shifting lever assembly between the different gear positions.

In order to prevent the shift lever assembly from pivoting to the assembly-permitting angular position a removable pawl is attached to the shifting lever assembly while the shifting lever assembly is in one of the gear positions. The pawl thus serves the two purposes of establishing the different gear positions and also preventing the axial removable of the pivot member during the pivoting of the shifting lever assembly between the gear positions. However, removal of the pawl will permit the shift lever assembly to be pivoted to the assembly-permitting angular position, in which position the pivot member can be removed either purposely or accidentally since the tab is aligned with the configurated opening in the flange.

DETAILED DESCRIPTION OF THE PREFERRED EMBODIMENT

Figure 1:
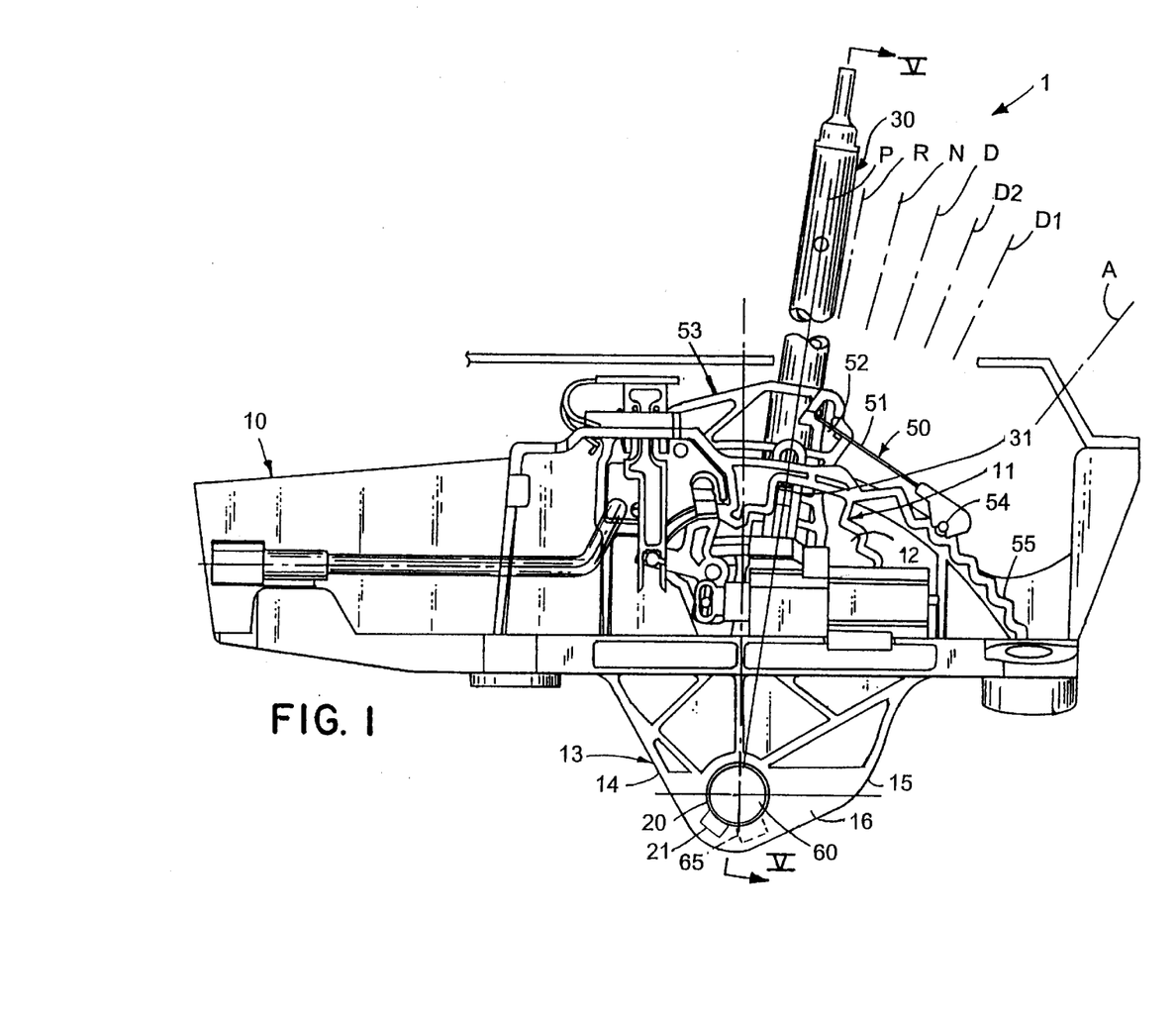
FIG. 1 is a side elevational view of a shifter embodying the present invention.
Figure 2:
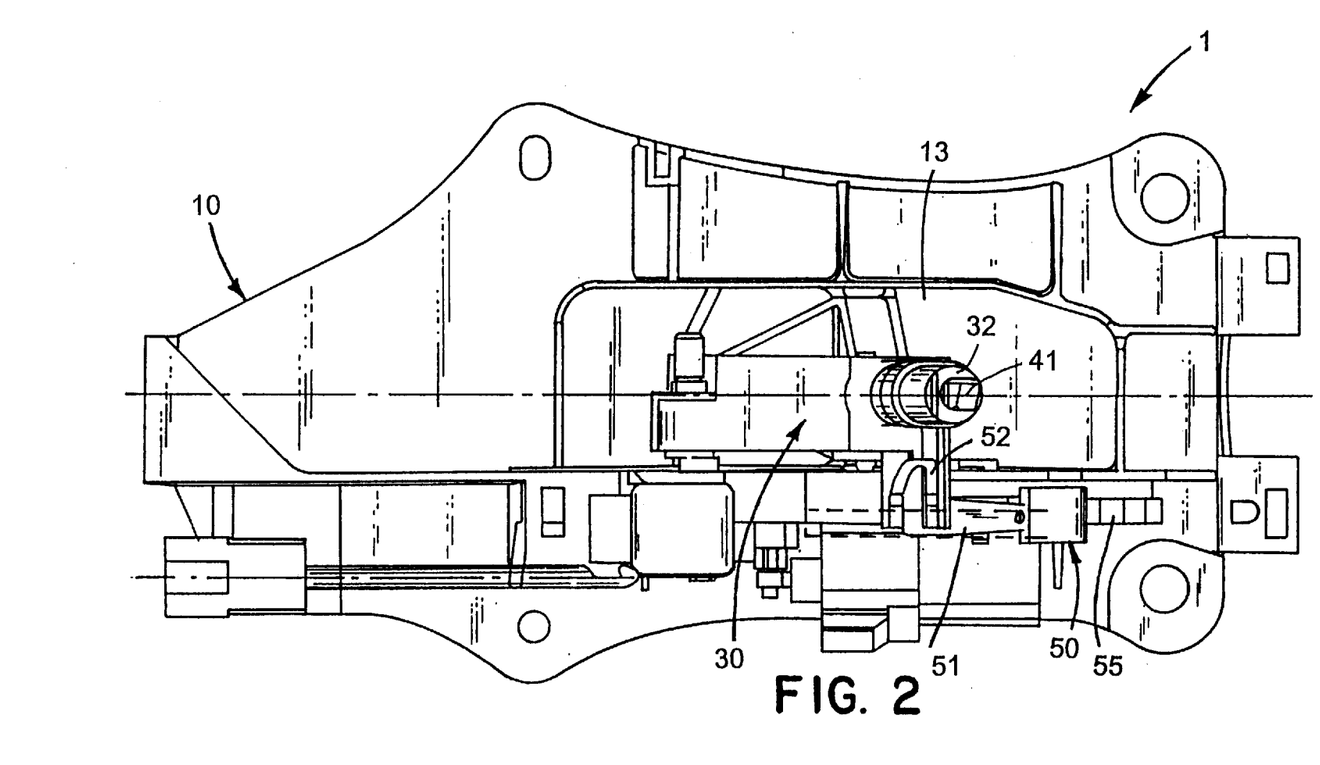
FIG. 2 is a top plan view of the shifter disclosed in FIG. 1.
Figure 3:
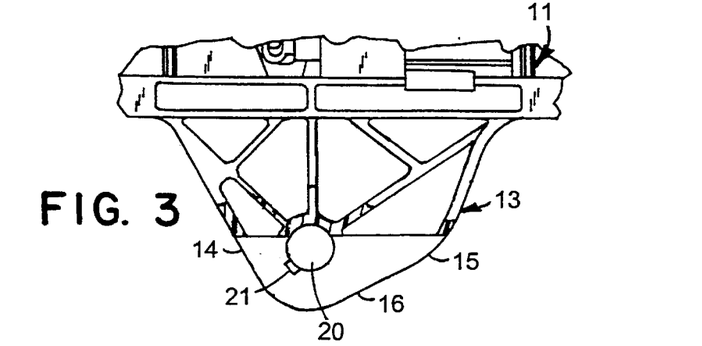
FIG. 3 is a fragmentary side elevational view of the lower portion of the base of the shifter of FIG. 1.

Referring to FIG. 1, reference numeral 1 designates a shifter for a vehicle, such shifter including the base 10, and the shift lever assembly 30 pivotally mounted on the base 10 for shifting to the various gear positions "P," "R,""N," "D," "D2," and "D1." The shifter assembly includes the pawl 31 (FIG. 5) engaging a notched aperture 12 in the detent plate 11. The position and depth of such notches determines the gear positions as the pawl 31 is moved by the driver to select the particular gear desired by the driver of the vehicle.

Figure 4:
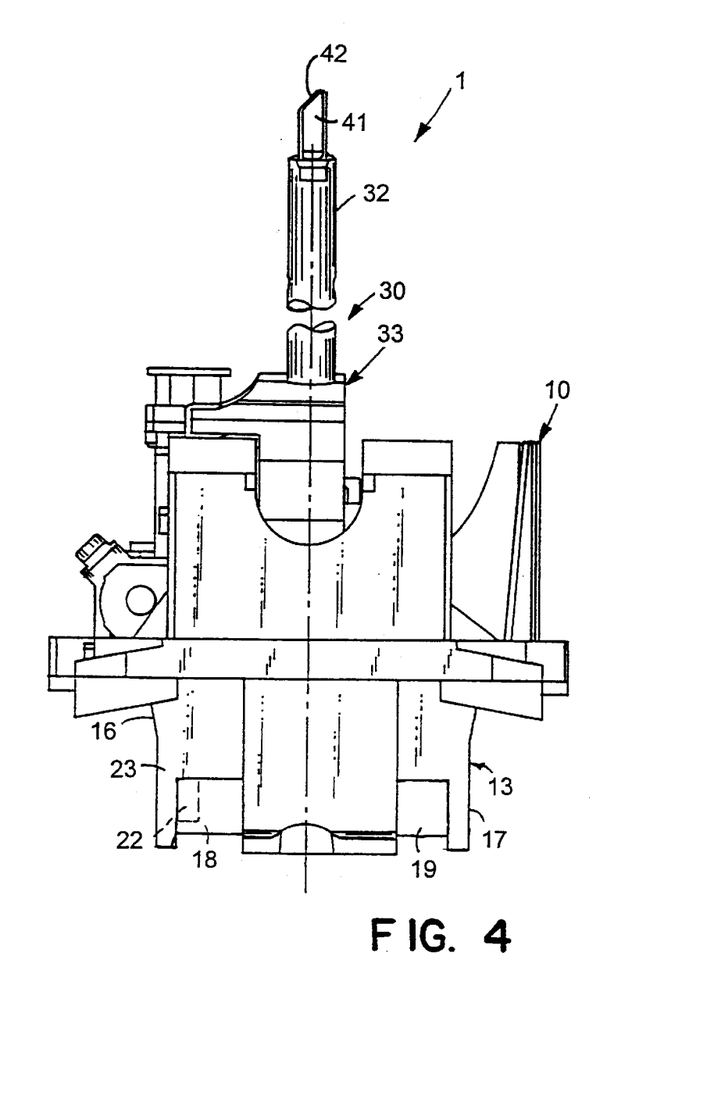
FIG. 4 is a rear end view of the shifter of FIG. 1.
Figure 9:
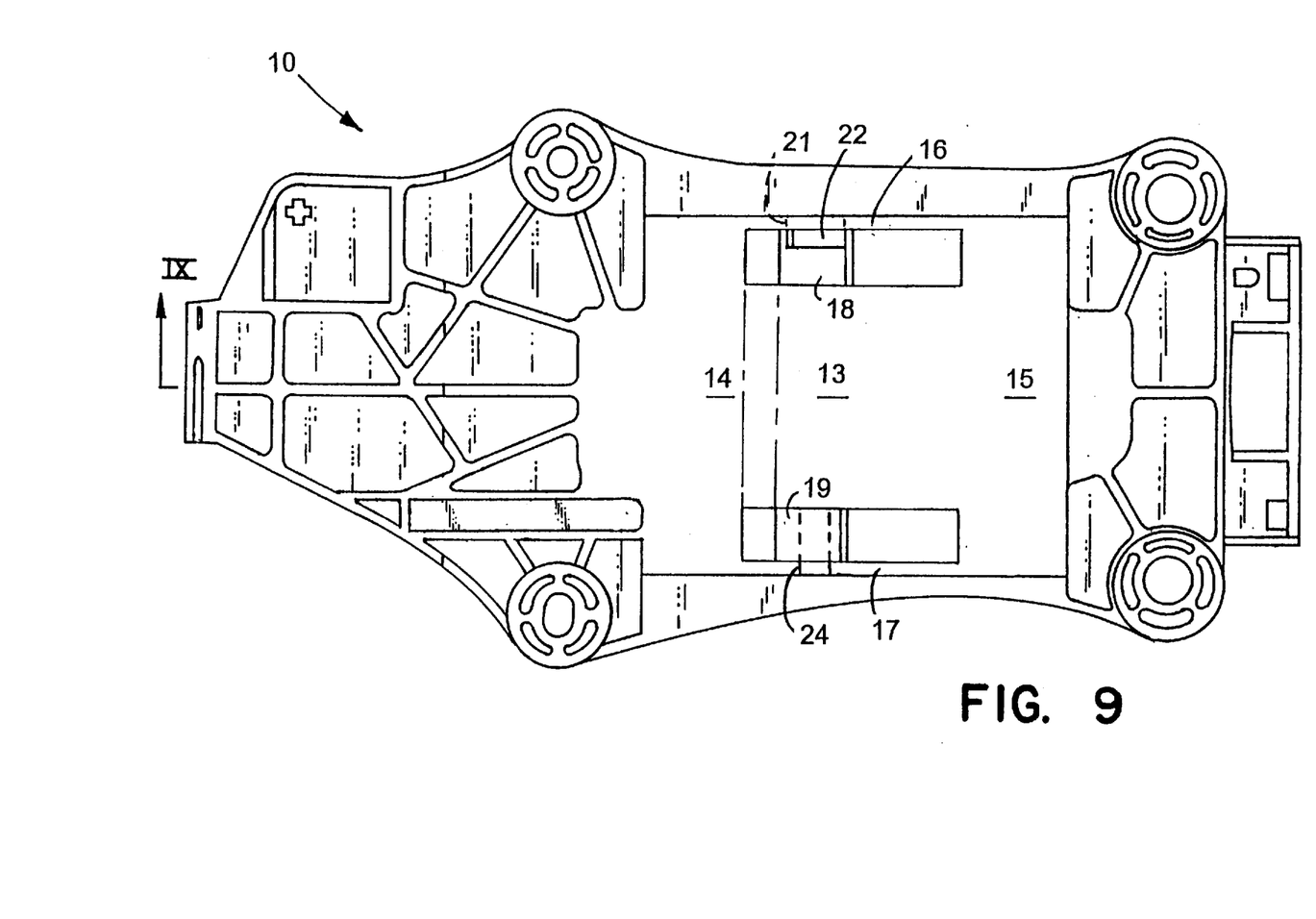
FIG. 9 is a bottom plan view of the base as disclosed in FIGS. 6 and 7.
Figure 10:
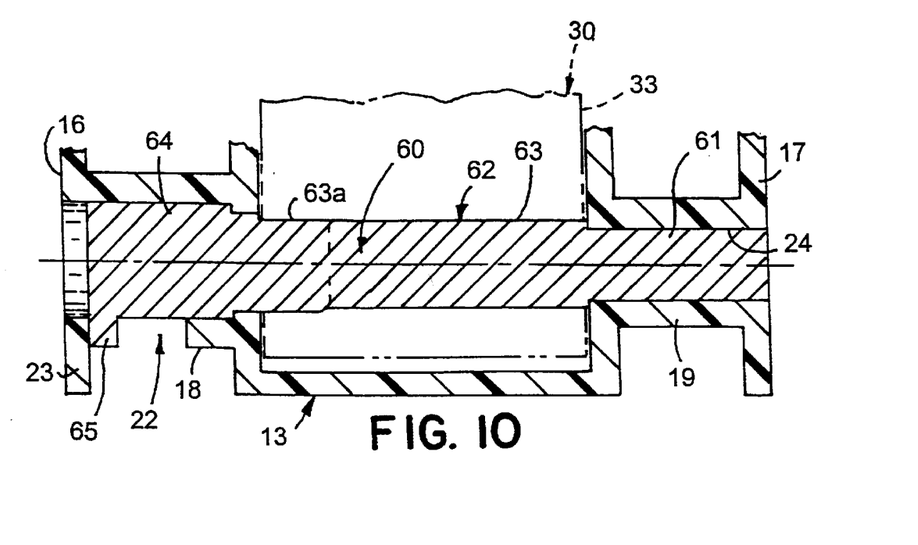
FIG. 10 is a cross-sectional view of the lower part of the base taken along the plane X—X as disclosed in FIG. 8, and in addition, disclosing the pivot member located in the bearings along with a portion of the shifting lever assembly disclosed in phantom.

This invention relates to the pivotal mounting of the shift lever assembly 30 to the base 10 which includes a pan-shaped depression or well 13 having a downwardly extending front wall 14 and rear wall 15 joined together and supporting the sidewalls 16 and 17. Sidewall 16 includes a socket 18 and sidewall 17 includes a socket 19 (FIGS. 4, 9, and 10). The sockets 18 and 19 are aligned and receive a uniquely shaped pivot member or pin 60, (FIGS. 5, 10, 13, and 14) which pivotally supports the shift lever assembly 30.

Sidewall 16 has a uniquely shaped opening 20 which is circular throughout a major portion thereof and includes a notch 21 extending radially therefrom for the purpose as will described hereinafter. Socket 18 includes a cutout 22 so as to provide a flange 23 for the purpose as will described hereinafter.

Figure 11:
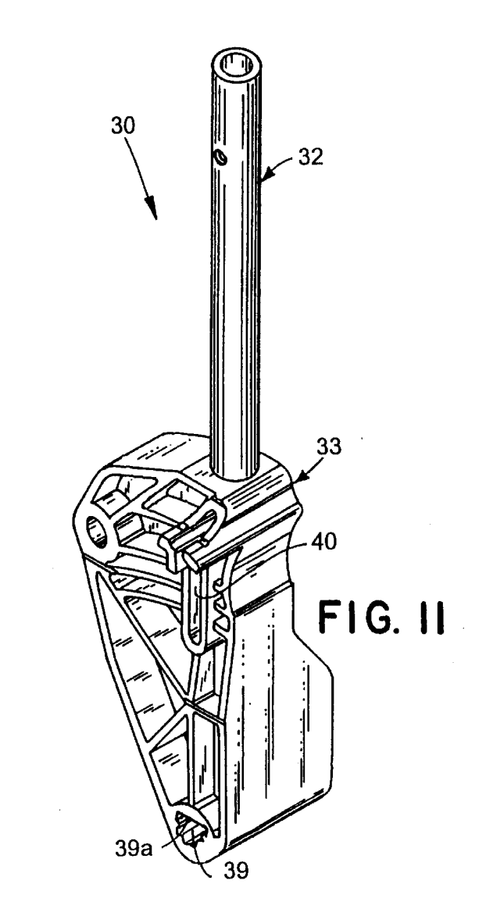
FIG. 11 is a perspective view of one side of a portion of the shift lever forming a part of the shifter of FIG. 1.
Figure 12:
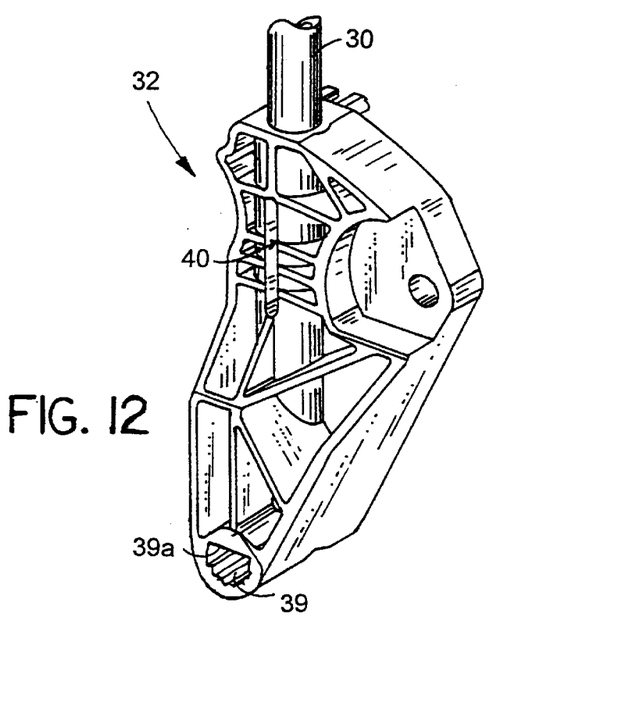
FIG. 12 is a perspective view of the other side of the portion of the shift lever assembly of FIG. 11.
Figure 13:
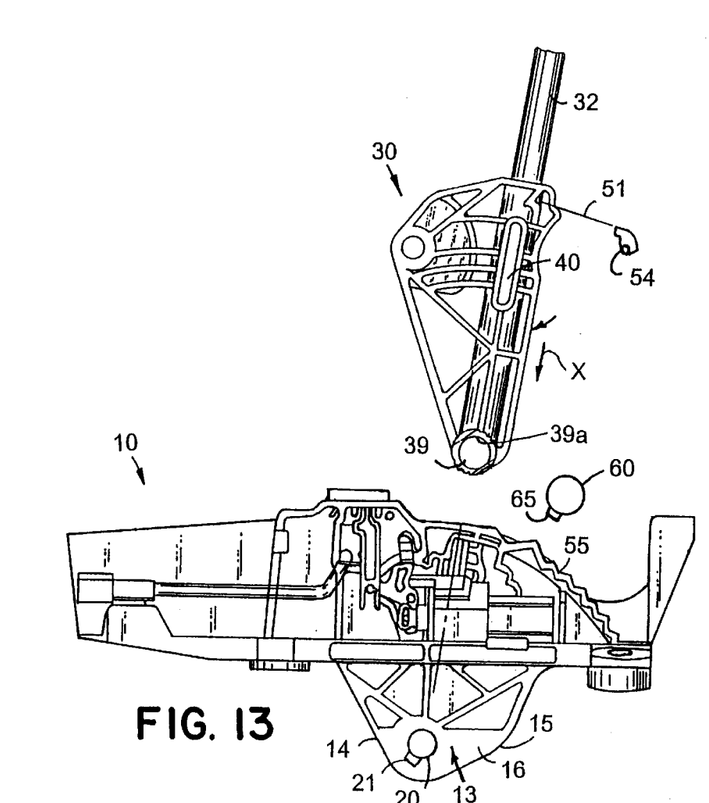
FIG. 13 is an exploded view of the components forming the shifter of FIG. 1 including the base, a portion of the shift lever assembly, and the pivot member.
Figure 14:
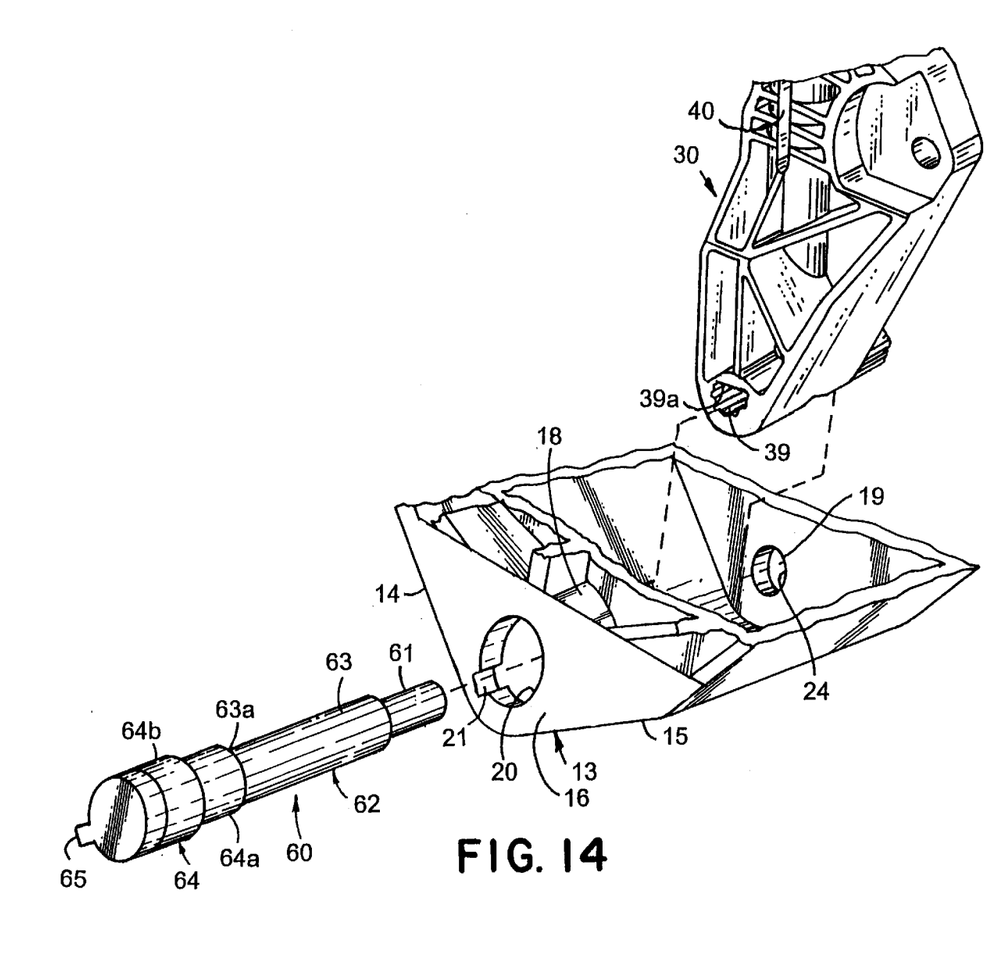
FIG. 14 is an exploded perspective view of portions of the components on the lower end of the shifter of FIG. 1 disclosing a cut-away of a portion of the lower end of the base, a portion of the shift lever assembly, and the pivot member.

Shift lever assembly 30 (FIGS. 5, 11, and 12) includes the tubular post 32 having a blind opening 34 into which the tubular post 32 extends. Preferably, the lower section of tubular post 32 is insert molded into the body 33 (FIG. 4). Further, body 33 includes a lining/sleeve 35 which receives the lower end 31a of pawl 31 and prevents the pawl from rattling or creating a grating noise as it moves within body 33. A spring 37 is located within the sleeve 35 for biasing pawl 31 upwardly through the top 38 of the tubular post 32. The lower end of body 33 includes an opening 39 for receiving the pivot member or pin 60. Opening 39 includes a flat portion 39a (FIGS. 3, 6, 8, 12, and 14) for the purpose as will described hereinafter.

Figure 5:
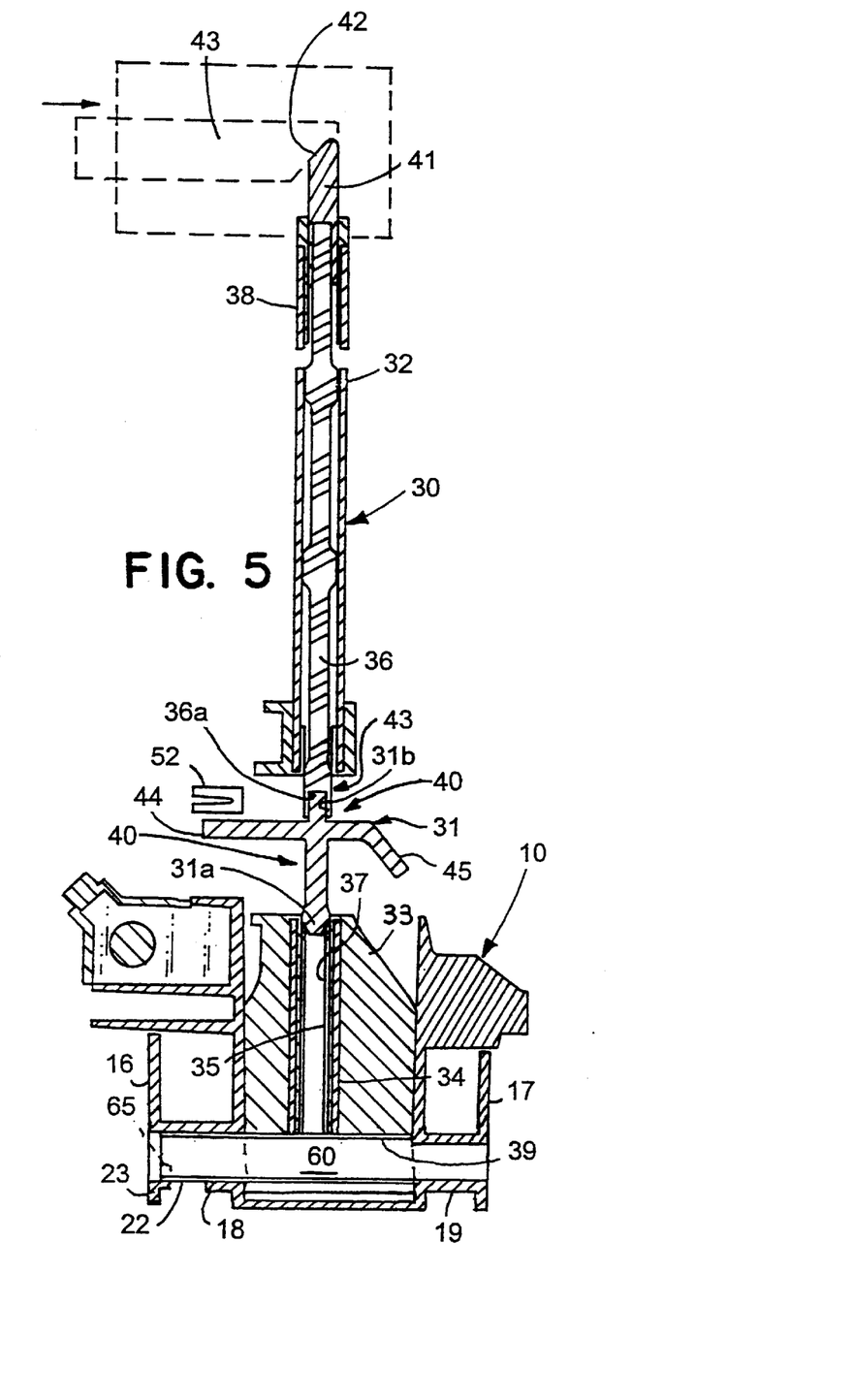
FIG. 5 is a cross-sectional view taken along the line V—V in FIG. 1.
Figure 6:
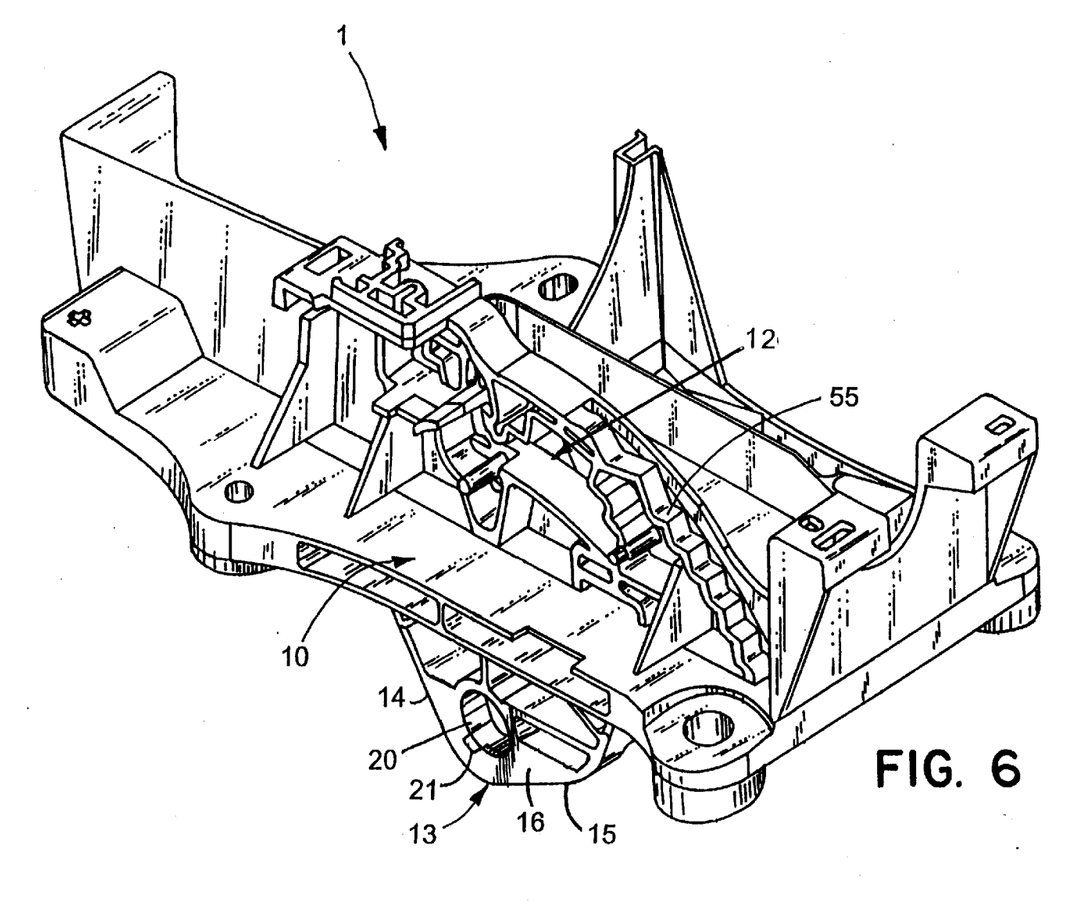
FIG. 6 is a top/side perspective view of the base of the shifter disclosing one side of the base as disclosed in FIG. 1.

Body 33 includes a slot 40 (FIG. 5, 11, 12, and 13) receiving pawl 31 to position it in the position of FIG. 5 in which position pawl 31 can be vertically actuated as the lower end 31a slides in the sleeve 35.

As disclosed in FIG. 5, the top end 31b of the pawl 31 is secured to a member generally referred to as a straw 36 which extends upwardly in tubular post 32 and is connected to a cam member 41 having a chamfered end 42 engaging a push button 43 that actuates pawl 31 by depressing it against chamfered end 42 which actuates straw 36 and pawl 31 against the bias of the spring 35.

It should be understood from FIG. 5 that slot 40 of body 33 and tubular post 32 is sufficiently long so as to permit installation of pawl 31 by grabbing handle 45 inserting end 31a within the sleeve and depressing spring 35 until the end 31b of pawl 31 can be inserted in the end opening 36a of straw 36. Pawl 31 is removable from body 33 by grabbing handle 45 and depressing the end 31a downwardly until the upper end 31b of the pawl disengages from straw 36. This permits the pawl 31 to be tipped and withdrawn from body 33 through slot 40.

A feel positioner sub-assembly 50 including a biasing leaf spring 51 is engaged with spring retainer 52 on body 53. Feel positioner sub-assembly 50 includes a roller 54 operably supported at the free end of the leaf spring 51 and engaging the depressions 55. The depressions 55 and roller 54 provide an aesthetic and comfortable feel for an operator as the operator shifts the shift lever assembly 30 between the various gear positions.

Figure 15:
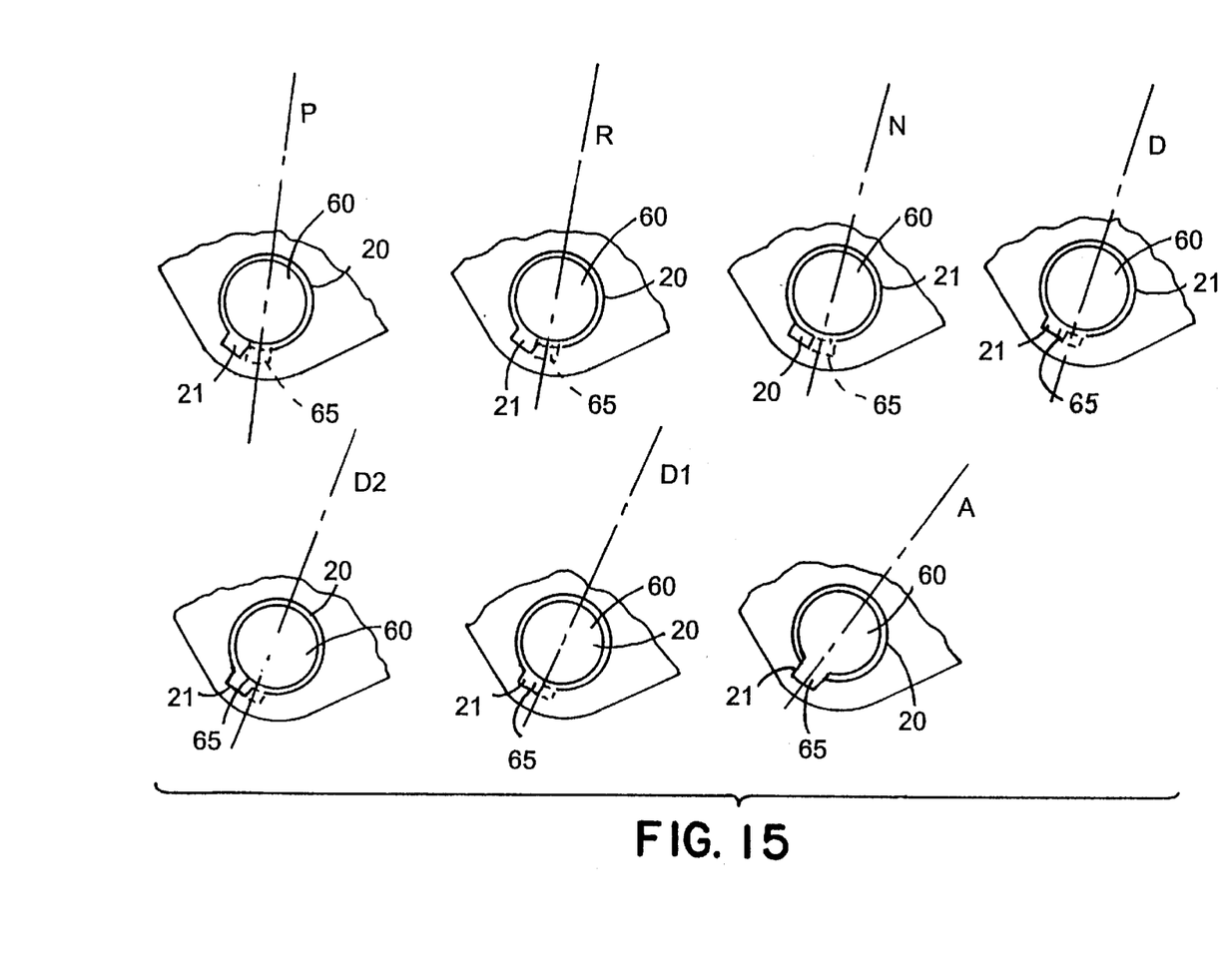
FIG. 15 discloses sketches of the various positions of the pivot member to demonstrate the position of the tabs with relation a flange of the base in the various gear positions of the shift lever assembly and when the shift lever assembly is in assembly-permitting angular position.

As previously stated, the shift lever assembly 30 is pivotally mounted within the well 13 between the sidewalls 16 and 17 by a uniquely shaped pin 60 which will now be described. Pin 60 is best disclosed in FIGS. 5, 10, and 14. It includes at one end 61 a reduced diameter portion of slightly less diameter than the diameter of the opening 24 of the socket 19 and intermediate portion 62 includes a flat 63 that corresponds to the shape of the flat 39a of the shift lever assembly 30. Thus, the pin 60 is keyed to the shift lever assembly so as to be pivoted together between the two sockets 18 and 19. The end 64 opposite end 61 has diameter sections 64a and 64b of greater diameters than the diameters of the end 61 and intermediate portion 62. It will be noted that section 64a also includes a flat 63a which engages a flat (not shown) in the opening 39. End 64 is pivoted within the socket 18. The most unique feature of pin 60 is the provision for a tab 65 located at the extreme end of the end 64. Tab 65 extends radially outwardly and is of a shape corresponding to the notch 21 of the opening 20. Thus, the extreme end of the end 64 can be inserted through the opening 20. An important aspect of the notch 21 and the tab 65 is the circumferential position of the same in relation to the pivotal positions "P," "R," "N," "D," "D2," "D1," and "A" of shift lever assembly 30. FIG. 15 illustrates this relative circumferential position of the notch 21 and tab 65 to the different angular positions of shift lever assembly 30.

Referring to FIG. 15, it will be noted that the tab 65 is aligned with the notch 21 only when the shift lever assembly is in the position "A." In this position "A," as illustrated by FIG. 1, the shift lever assembly 30 is shifted to the right beyond all of the gear positions "P," "R," "N," "D," "D2," and "D1." This position "A" is the assembly-permitting angular position of the shift lever assembly 30. It is at this position that the pin 60 can be fully inserted as disclosed in FIG. 10. In this fully inserted position, tab 65 is located inside of the flange 23 in which position pivoting of the shift lever assembly 30 with the pin 60 will locate tab 65 in the cutout 22 behind the flange 23 thus preventing the purposely or accidentally withdrawal of pin 60 from the sockets 18 and 19.

Figure 7:
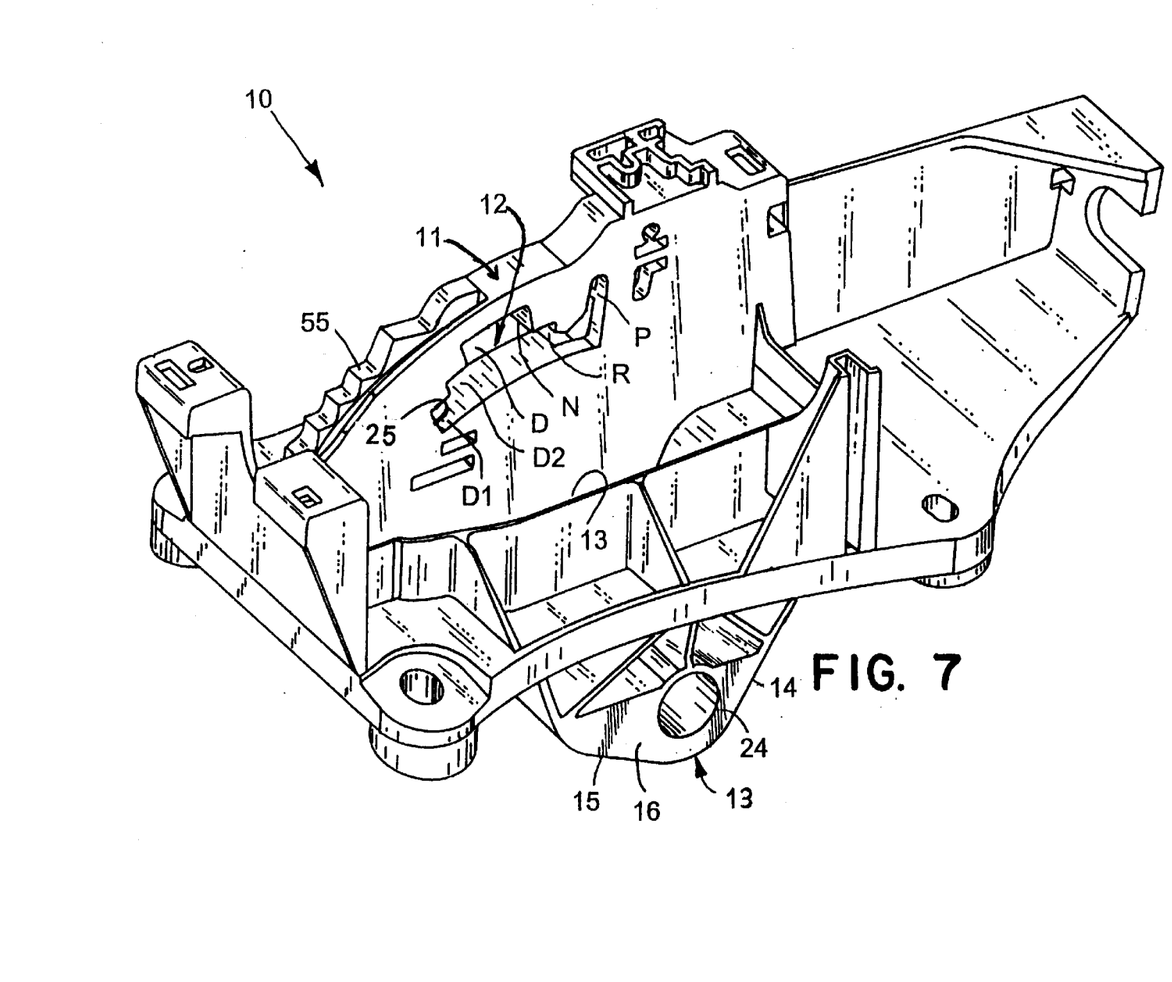
FIG. 7 is a top/side perspective view of the base of FIG. 6 disclosing the other side of such base.
Figure 8:
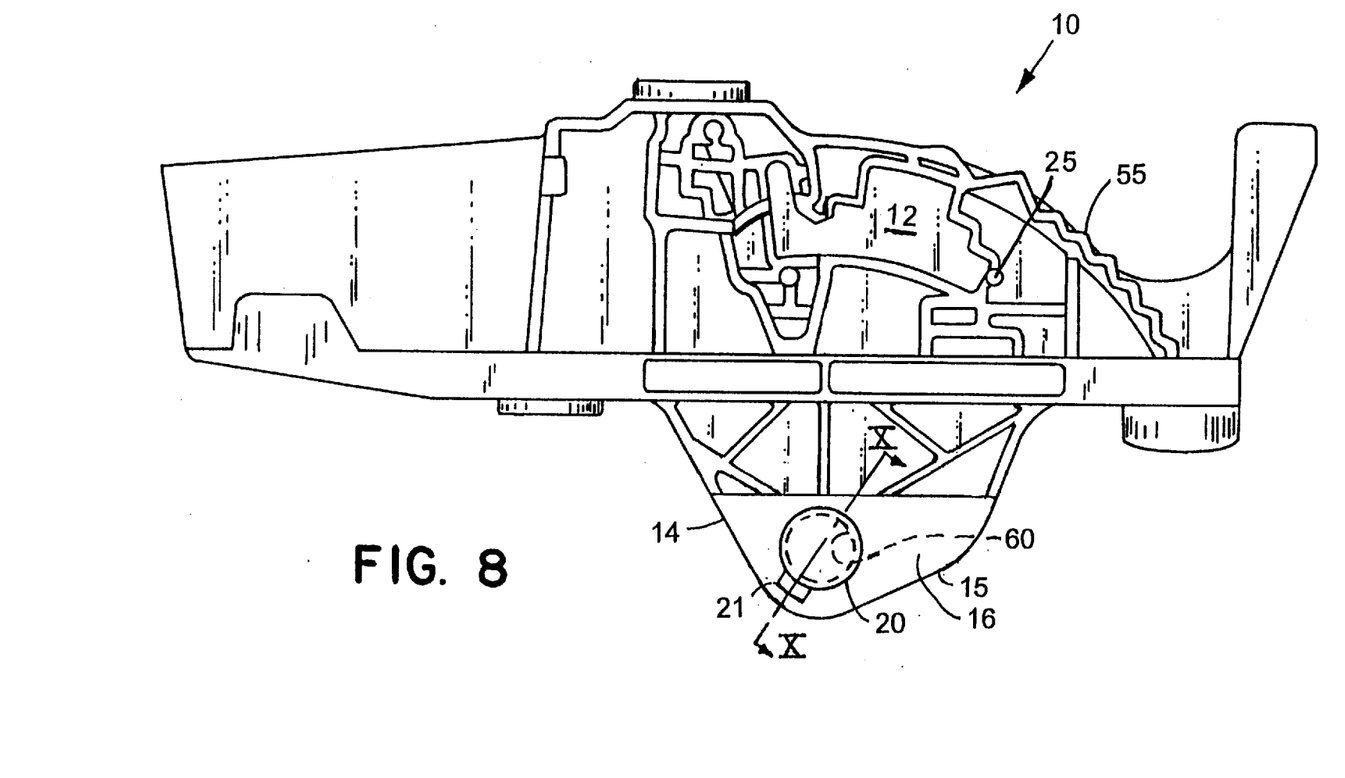
FIG. 8 is a side view of the base shown in FIGS. 6 and 7.

As previously disclosed, pawl 31 is removable from the shift lever assembly 30. Accordingly, pawl 31 must be removed prior to pivoting the shift lever assembly 30 to the position "A," that is, the assembly-permitting angular position. However, after the pin 60 has been inserted while the shift lever assembly is in the "A" position, the shift lever assembly is then pivoted to a gear position. The pawl 31 is then attached to the shift lever assembly by sliding pawl 31 into slot 40 inserting the end 31*a* of pawl 31 into the sleeve 35 against the bias of spring 37 until the end 31*b* of pawl 31 is in position to be received within the blind opening 36*a* of the straw 36 (FIG. 5). Once the pawl 31 is in place within the shift lever assembly, the end 44 of pawl 31 extends into the notched aperture 12 and engages one of the notches. As will be evident from FIGS. 1, and 7 the pawl 31 is captured in the notched aperture 12 of detent 11 so that the shift lever assembly is prevented from being pivoted beyond the "D1" gear position as it strikes the end wall 25 of the notched aperture 12 which forms a stop. Further as evidenced from FIG. 15 in any of the gear positions "P," "R," "N," "D," "D2" and "D1" tab 65 is located behind flanges 23 thus preventing the pin 60 from being withdrawn or accidently fallen out from the sockets 18 and 19 and from the opening 39 of the shift lever assembly.

METHOD OF ASSEMBLY

Having described the details of the present invention, the method of assembling the shift lever assembly 30 to the base 10 should be quite clear. At the expense of perhaps being repetitive, the method will now be described.

The first step is to remove the pawl 31 from the shift lever assembly or at least being sure that the pawl is not in place. Then the shift lever assembly 30 is inserted from the top (FIG. 13) into the well 13 of base 10 by inserting the body 33 into the well 13 with the opening 39 aligned with the sockets 18 and 19. The shift lever assembly is pivoted to the "A" position as disclosed in FIGS. 1 and 15 in which position the tab 65 will be. aligned with the notch 21 of the opening 20. In this position the flats 63 and 63*a* of pin 60 are aligned with the flat 39*a* of the opening 39 of the shift lever assembly 30. In this position, the pin 60 is inserted through opening 20, through opening 39 of the shift lever assembly, and into the opening 24 of the socket 19. When the pin 60 is inserted all the way into slot the position as disclosed in FIGS. 5 and 10, the shift lever assembly is then pivoted to at least one of the gear positions "P," "R," "N," "D," "D2," and "D1." In one of these positions the pawl 31 is then attached to the shift lever assembly by inserting the end 36 ends 44 and 31*a* of pawl 31 (FIG. 5) into 40 and inserting end 31*a* into sleeve 35 against the bias of spring 37 until the top end 31*b* can be inserted within the blind hole 36*a* of the straw 36. In attaching the pawl 31 to the shift lever assembly it is obvious that the end 44 is inserted through opening 40 and extends into the notched aperture 12. In this position the shift lever 30 can be pivoted to the various gear positions by depressing button 43 which depresses straw 36 and pawl 31 permitting shifting to any gear desired but preventing the pivoting of the shift lever assembly to the "A" position, that is, the assembly-permitting angular position.

It should be quite clear that the shift lever assembly can be disassembled by removing the pawl 31, pivoting the shift lever assembly to the "A" position and then pushing the pin 60 out of the sockets 18 and 19 and out of the opening 39 of the shift lever assembly.

From the foregoing description, it should be readily appreciated by those skilled in the art that modifications may be made to this invention without departing from the concepts disclosed herein and the spirit of the invention. Such modifications are to be considered as covered by the following claims.

I claim:

1. A shifter for a vehicle comprising:

a base for attachment to a vehicle, the base including spaced, aligned sockets;

a pivot member;

said aligned sockets having aligned first openings for pivotally receiving said pivot member;

a shift lever assembly having a portion located between said sockets and having a second opening for receiving said pivot member whereby said shift lever assembly is pivotable between said sockets with said pivot member about an axis of rotation between an assembly-permitting angular position and a plurality of gear positions;

said pivot member includes a tab at one end thereof extending radially from said pivot member;

said base including a flange having an outer surface and an inner surface located laterally outwardly of one of said sockets and having a third opening configured to receive said pivot member and tab when said shift lever assembly is in an assembly-permitting angular position; and at least a portion of the inner surface of said flange being spaced from said one of said sockets to permit said pivot member with said tab to pivot with said shift lever assembly to said gear positions behind the inner surface of said flange to thereby prevent said pivot member from being withdrawn from said aligned sockets when said shift lever assembly is in any one of said gear positions.

2. The shifter defined in claim 1 in which a stop is provided on at least one of said base and shift lever assembly for preventing the shift lever assembly from accidentally returning to the assembly-permitting angular position after assembly.

3. The shifter of claim 2 in which said base includes a stop engaged by a removable pawl mounted on said shift lever assembly.

4. The shifter of claim 1 in which said shift lever assembly includes a pawl and said base includes a plurality of notches for receiving said pawl thereby defining the gear positions of said shift lever assembly;

said pawl being removable permitting the shift lever assembly to pivot to said assembly-permitting angular position.

5. The shifter of claim 1 in which said pivot member is a pin having, generally a circular cross section except a first flat portion; said first opening receiving said pin and having a second flat portion engaging said first flat portion rendering said shift lever assembly pivotable with said pin.

6. The shifter of claim 1 in which said base includes a well having spaced sidewalls, said sidewalls having aligned openings comprising said aligned sockets receiving said pivot member; one of said sidewalls including a recess located adjacent and radially outwardly of said one socket thereby forming said flange; a cutout in said one socket extending to said recess for receiving said tab upon pivoting of said pivot member and shift lever assembly to said gear positions.

7. The shifter defined in claim 6 in which a stop is provided on at least one of said base and shift lever assembly for preventing the shift lever assembly from accidentally returning to the assembly-permitting angular position after assembly.

8. A shifter for a vehicle comprising:

a base for attachment to a vehicle, the base including spaced sidewalls, said spaced sidewalls having aligned openings forming bearings for a pivot pin;

a pivot pin having a radially extending tab at one end thereof;

a shift lever assembly having a first opening receiving said pivot pin whereby said shift lever assembly is pivotable with said pivot member in said bearings about an axis of rotation between an assembly-permitting angular position and a plurality of gear positions;

one of said sidewalls including a recess located adjacent and radially outwardly of one of said bearings located in said one of said sidewalls thereby forming a flange with a space located between said one of said bearings and said flange; said flange having a flange opening with a configuration to receive said pivot pin and tab said recess formed by a cutout in said one of said sidewalls receiving said tab in said space after inserting said pivot pin into said bearings and said one end of said pivot pin and tab through said flange opening with a configuration and pivoting of said pivot pin and shift lever assembly to said gear positions.

9. The shifter defined in claim 8 in which a stop is provided on at least one of said base and shift lever assembly for preventing the shift lever assembly from accidentally returning to the assembly-permitting angular position after assembly.

10. The shifter of claim 9 in which said base includes a stop engaged by a removable pawl mounted on said shift lever assembly.

11. The shifter of claim 8 in which said shift lever assembly includes a pawl and said base includes a plurality of notches for receiving said pawl thereby defining the gear positions of said shift lever assembly;

said pawl being removable permitting the shift lever assembly to pivot to said assembly-permitting angular position.

12. The shifter of claim 8 in which said pivot pin includes a first flat and said first opening includes a second flat engaging said first flat rendering said shift lever assembly pivotable with said pivot pin.

13. A method of assembling a shifting lever for pivotally movement on a base having spaced sidewalls with a first and second bearings having aligned bearing openings and a plurality of gear positions comprising:

providing a pivot member having at one end a radially extending tab;

providing a shift lever assembly having a first opening for receiving said pivot member whereby said shift lever assembly is pivotable with said pivot member in said aligned openings about an axis of rotation between an assembly-permitting angular position and a plurality of gear positions;

providing said base with a flange located outwardly of one of said bearings to provide a space therebetween, said flange having a second opening with a configuration for receiving said one end of said pivot member including said tab;

inserting a portion of said shifting lever assembly between said spaced side walls with said second opening axially aligned with said aligned openings;

pivoting said shift lever assembly to said assembly-permitting angular position;

inserting the other end of said pivot member through said second opening in said flange; through said one of said aligned openings, through said first opening, and into the other of said aligned openings, and inserting said one end of said pivot member with said radially extending tab through said second opening of said flange into said space between said flange and said one of said bearings; and pivoting said shift lever assembly to at least one of said gear positions causing said tab to pivot into the space between one of said aligned openings and said flange thereby preventing axial removal of said pivot member during the pivoting of said shifting lever assembly between gear positions.

14. A method of assembling a shifting lever for pivotally movement on a base having spaced sidewalls with a first and second bearings having aligned bearing openings and a plurality of gear positions comprising:

providing a pivot member having at one end a radially extending tab;

providing a shift lever assembly having a first opening for receiving said pivot member whereby said shift lever assembly is pivotable with said pivot member in said aligned openings about an axis of rotation between an assembly-permitting angular position and a plurality of gear positions;

providing said base with a flange located outwardly of one of said bearings to provide a space therebetween, said flange having a second opening with a configuration for receiving said one end of said pivot member including said tab;

inserting a portion of said shifting lever assembly between said spaced side walls with said second opening axially aligned with said aligned openings;

pivoting said shift lever assembly to said assembly-permitting angular position;

inserting the other end of said pivot member through said second opening in said flange; through said one of said aligned openings, through said first opening, and into the other of said aligned openings, and inserting said one end of said pivot member with said radially extending tab through said second opening of said flange into said space between said flange and said one of said bearings;

pivoting said shift lever assembly to at least one of said gear positions causing said tab to pivot into the space between one of said aligned openings and said flange thereby preventing axial removal of said pivot member during the pivoting of said shifting lever assembly between gear positions; and attaching a removable pawl to said shifting lever assembly while said shifting lever assembly is in one of said gear positions.

* * * * *